United States Patent [19]

Moore

[11] Patent Number: 4,786,970

[45] Date of Patent: Nov. 22, 1988

[54] LOGARITHMIC AMPLIFIER

[75] Inventor: Leslie G. Moore, Webster, N.Y.

[73] Assignee: Eastman Kodak Company, Rochester, N.Y.

[21] Appl. No.: 171,977

[22] Filed: Mar. 23, 1988

Related U.S. Application Data

[63] Continuation of Ser. No. 89,707, Aug. 26, 1987.

[51] Int. Cl.[4] .............................................. H04N 5/14
[52] U.S. Cl. ................................... 358/184; 307/492; 307/310; 328/145
[58] Field of Search ................ 358/184; 307/491, 492, 307/310, 359; 328/145

[56] References Cited

U.S. PATENT DOCUMENTS

| | | | |
|---|---|---|---|
| 3,571,618 | 3/1971 | Inacker et al. | 307/492 |
| 3,573,491 | 4/1971 | Goss et al. | 307/492 |
| 3,745,474 | 7/1973 | Hughes | 307/492 X |
| 3,845,326 | 10/1974 | Godden | 328/145 X |
| 3,965,371 | 6/1976 | Sato et al. | 307/359 X |
| 4,100,433 | 7/1978 | Duffy et al. | 307/229 |
| 4,324,990 | 4/1982 | Gay | 307/359 X |
| 4,333,023 | 6/1982 | Hood, Jr. | 307/310 |
| 4,442,549 | 4/1984 | Main | 455/211 |
| 4,463,274 | 7/1984 | Swartz | 307/491 |
| 4,604,532 | 8/1986 | Gilbert | 307/490 |
| 4,613,776 | 9/1986 | Ishii | 307/490 |

FOREIGN PATENT DOCUMENTS 61-96810  5/1986  Japan .................. 307/492

OTHER PUBLICATIONS

Drazhev et al., "High-Speed Logarithmic Video Amplifiers", 1980, pp. 106–108.

Primary Examiner—James J. Groody
Assistant Examiner—E. Anne Faris
Attorney, Agent, or Firm—Raymond L. Owens

[57] ABSTRACT

A D.C. stabilized logarithmic amplifier which uses bipolar transistors which produces an output voltage $V_{out(comp)}$ temperature compensated for the saturation leakage current $I_s$ and the thermal voltage $V_t$.

1 Claim, 2 Drawing Sheets

LOGARITHMIC AMPLIFIER

This is a continuation of the earlier filed application Ser. No. 089,707, filed on Aug. 26, 1987.

FIELD OF THE INVENTION

The present invention relates to temperature compensated logarithmic amplifiers suitable for use with video signals.

DESCRIPTION RELATIVE TO THE PRIOR ART

A variety of different techniques exist for providing a logarithmic operation on an input voltage video signal. One of the most common approaches is to use a diode connected in the feedback path of an operational amplifier. The output voltage of such a combination is a logarithmic function. The bandwidth range of logarithmic amplifiers of this type is limited by a number of independent factors, including the open loop gain of the operational amplifier.

The bipolar transistor as is well known has an inherent logarithmic characteristic defined in equation (1).

$$I_c = I_s e^{(V_{BE}/V_t)} \tag{1}$$

Taking the natural log:

$$V_{BE} = V_t(\ln I_c - \ln I_s) \tag{2}$$

where
- $V_{BE}$ = base to emitter voltage
- $V_t = KT/q$ (thermal voltage)
- $I_c$ = collector current
- $I_s$ = saturation leakage current (temperature dependent).

Equation (2) shows the problem of using bipolar transistors to perform a logarithmic operation; namely, $I_S$ and $V_t$ are temperature dependent and provide separate and distinct temperature effects.

SUMMARY OF THE INVENTION

The object of this invention is to provide a logarithmic amplifier which uses bipolar transistors and is compensated for $I_S$ and $V_t$ and has temperature compensated D.C. stabilization.

This object is achieved by a DC stabilized logarithmic amplifier which in response to an input video signal $V_{in}$ having blanking and picture information intervals provides a temperature compensated logarithmic signal $V_{out(comp)}$ which is compensated for $V_t$ and $I_S$, comprising:

a. A logarithmic amplifier cell having first and second matched bipolar transistors connected to compensate for $I_S$ and a third transistor connected in series with the second transistor for providing a constant collector current $I_{REF}$ through the second transistor, a voltage $V_{out}$ being taken from the junction of the second and third transistors;

b. feedback means including:
  i. a voltage to current convertor responsive to $V_{in}$ and an error signal to provide the collector current $I_c$ for the first transistor during picture information intervals;
  ii. means for producing a black reference current $I_{BLK}$ and for summing such $I_{BLK}$ current with the output of said voltage to current converter during the blanking interval to provide the collector current $I_c$ during blanking for the first transistor; and
  c. a clamp feedback circuit producing the error signal and during the blanking interval being responsive to $V_{out}$ to adjust the error signal so that $I_c$ equals $I_{REF}$ thereby providing temperature compensated D.C. stabilization for $V_{out}$; and
d. a $1/V_t$ amplifier responsive to $V_{out}$ for correcting the thermal voltage $V_t$ to provide a compensated voltage $V_{out(comp)}$ during the picture interval.

DESCRIPTION OF PREFERRED EMBODIMENT

Figure 1:
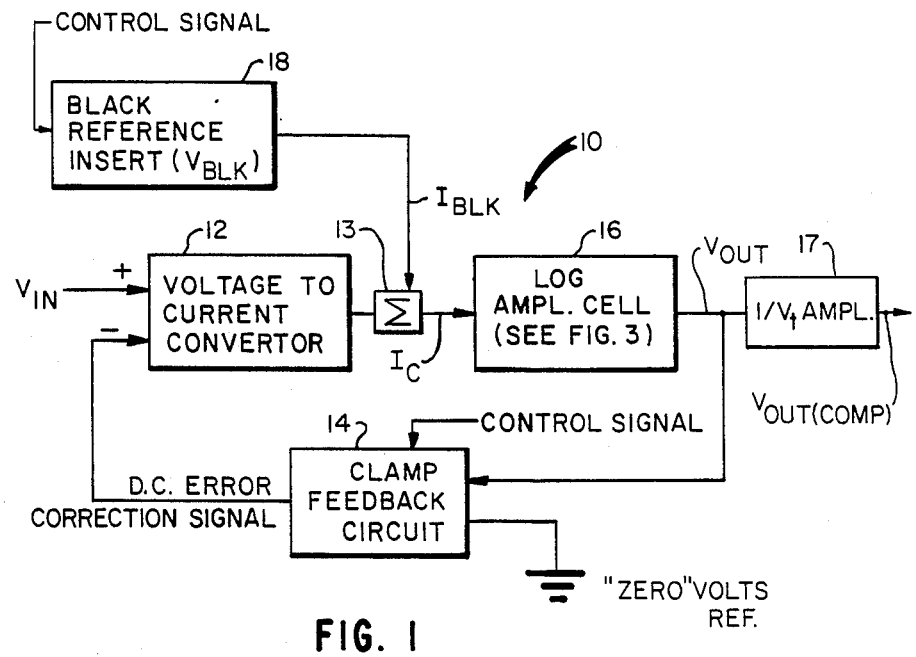
FIG. 1 is a block diagram of a logarithmic amplifier in accordance with the invention.
Figure 2:
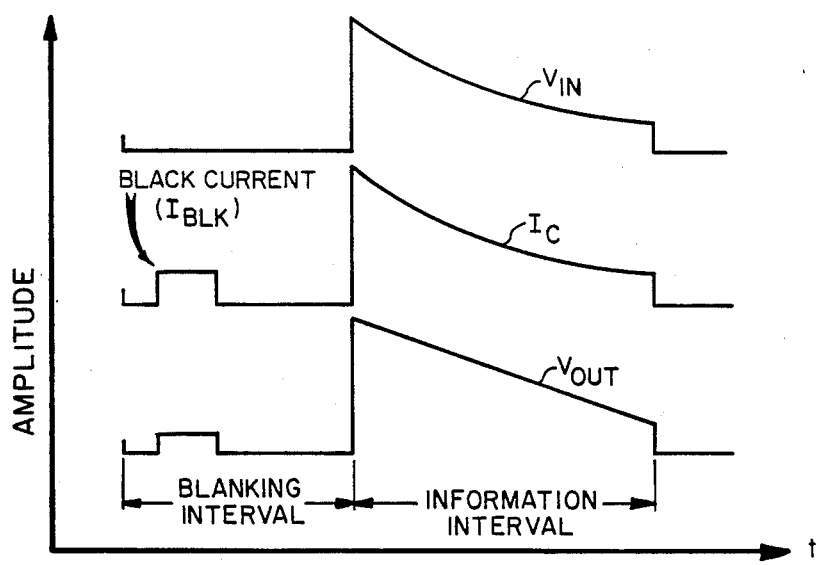
FIG. 2 depicts waveforms for signal parameters shown in FIG. 1.

Turning now to FIG. 1 which shows a block diagram of a logarithmic amplifier 10 in accordance with the invention. The input voltage signal $V_{in}$ is applied to a voltage to current convertor 12. An error signal produced by a clamp feedback circuit 14 is also applied to the voltage to current convertor 12. The output of the voltage to current convertor 12 is applied to a summing circuit 13 which produces the collector current $I_c$ used to drive a logging transistor $Q_1$ in a log amplifier cell 16. See FIG. 3. The voltage to current convertor 12 does not require accurate DC offset stabilization due to the use of the feedback clamp circuit 14. During blanking, the summing circuit 13 receives a DC reference current $I_{BLK}$ produced by a black reference insert circuit 18. $I_{BLK}$ reference current is selected so that as shown in FIG. 2 the output $V_{out}$ and also $V_{out(comp)}$ (not shown) are straight line functions in response to an exponential $V_{in}$. The clamp feedback circuit (14) samples the output voltage $V_{out}$ during a blanking interval of the input video voltage signal $V_{in}$ and adjusts the DC correction error signal, so as to change the value of $I_c$ in a manner which will be described later. See FIG. 2. The feedback clamp circuit 14 continuously provides the same error signal to the voltage to current convertor 12 during the picture information interval. This signal is only adjusted during the blanking interval. The feedback clamp circuit 14 generates the DC correction error signal by comparing the signal $V_{out}$ with a zero volt reference. FIG. 2 shows several representative wave forms of signals $V_{in}$, $I_c$, and $V_{out}$. The input voltage $V_{in}$, in linear space, includes a blanking interval and picture information interval. The output of the voltage to current convertor ($I_c$) is also in the linear space. During the blanking interval, a control signal causes the black reference insert circuit 18 to add in a current $I_{BLK}$ and a control signal causes the clamp feedback circuit 14 to sample $V_{out}$ of the log amplifier cell 16 and adjust the D.C. error signal provided to the voltage to current convertor 12. The arrangement to temperature compensate for $I_S$ will now be described in connection with the circuit shown in FIG. 3.

Figure 3:
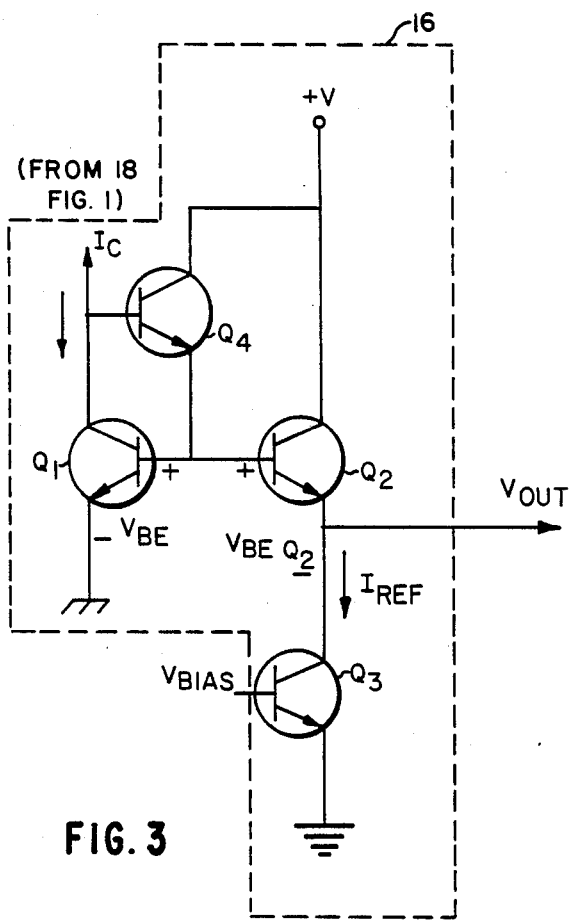
FIG. 3 is a schematic diagram of the logarithmic amplifier cell shown in FIG. 1.

As shown in FIG. 3, two matched bipolar transistors $Q_1$ and $Q_2$ have their bases connected. Collector current for the logging transistor $Q_1$ is the current $I_c$ produced by the voltage to current convertor 12. A fixed reference voltage $V_{BIAS}$ is applied to the base of the transistor $Q_3$ which is connected to the transistor $Q_2$. The transistor $Q_3$ provides a constant current source and produces a constant collector current $I_{REF}$ which is a function of the level of $V_{BIAS}$. $I_{REF}$ is the emitter current and approximately the collector current for transistor $Q_2$. The output $V_{out}$ is taken at the junction of the emitter of transistor $Q_2$ and the collector of transistor $Q_3$. A transistor $Q_4$ is connected so that its collector is coupled to the positive potential V. This same potential is applied to the collector of transistor $Q_2$. The emitter of transistor $Q_4$ is electrically connected to the base of both the matched transistors $Q_1$ and $Q_2$. The input current $I_c$ also provides driving current through the base of the transistor $Q_4$. This particular circuit arranging is such that the output voltage $V_{out}$ is compensated for $I_S$. A conventional 1/VT amplifier 17 compensates for Vt and produces the output signal $V_{out(comp)}$. The operation of amplifier 17 will be discussed later.

The operation of the log cell 16 will now be described. First, $I_S$ of the logging transistor $Q_1$ is assumed to be the same as $I_S$ for the matching transistor $Q_2$. By Kirchoff's voltage law:

$$V_{out} = V_{BE\ Q1} - V_{BE\ Q2} \tag{3}$$

From Equation (1):

$$V_{out} = V_t (\ln I_c - \ln I_{REF} + \ln I_{SQ1} - \ln I_{SQ2}) \tag{4}$$

$$V_{out} = V_t (\ln I_c - I_{REF}) \tag{5}$$

Equation (4) demonstrates that the output voltage $V_{out}$ has been temperature compensated for $I_S$. During the blanking interval the clamping feedback circuit 14 in response to the control signal samples the output voltage $V_{out}$ to adjust the error signal. By using a "0" reference voltage as an input to circuit 14 and comparing it with $V_{out}$, $I_c$ is forced to equal $I_{REF}$. $I_c$ during such interval is equal to $I_{BLK}$ since $V_{in}$ is equal to zero. Since $I_c$ equals $I_{REF}$, from Equation 5, $V_{out}$ is made equal to zero and $V_{out}$ is D.C. stabilized. The current $I_{REF}$ is a constant.

During blanking at the output of the log cell 16 $V_{out}$ includes a $V_t$ term. With the equation (5) being set equal to zero, and $I_c = I_{REF}$ the value of $V_t$ is irrelevant and will not affect the clamping operation. Thus the clamping operation is unaffected by both $I_S$ and $V_t$. $I_S$ is removed and $V_t$ is forced to be irrelevent by equation (5) being set equal to zero. This is what is meant by temperature compensated D.C. stabilization for $V_{out}$. The 1/$V_t$ compensated amplifier 17 is required to compensate for $V_t$ on the $V_{out}$ signal and produces $V_{out(comp)}$.

Amplifier 17 has a gain which is dependent on 1/$V_t$. This gain can be accomplished as will be understood to these skilled in the art by including transistors matched to log transistor $Q_1$. Its offset voltage drift need not be specified and is not of a concern because of the location at the clamp feedback circuit 14.

In operation during the picture interval, increasing the current $I_c$ causes $V_{out(comp)}$ to increase. Similarly, when $I_c$ decreases, $V_{out(comp)}$ decreases. $V_{out(comp)}$ is compensated for $I_S$ and $V_t$.

The invention has been described in detail with particular reference to certain preferred embodiments thereof, but it will be understood that variations and modifications can be effected within the spirit and scope of the invention.

I claim:
1. A D.C. stabilized logarithmic amplifier which in response to an input video signal $V_{in}$ having blanking and picture intervals provides a temperature compensated logarithmic signal $V_{out(comp)}$, compensated for a thermal voltage $V_t$ and a saturation leakage current $I_S$, comprising:
   a. a logarithmic amplifier cell having first and second matched bipolar transistors connected to compensate for $I_S$ and a third transistor for providing a constant collector current $I_{REF}$, through the second transistor, an output voltage $V_{out}$ being produced at the junction of the second and third transistors and;
   b. feedback means including:
      i. a voltage to current convertor responsive to $V_{in}$ and an error signal to provide the collector current $I_c$ for the first transistor during picture information intervals;
      ii. means for producing a black reference current $I_{BLK}$ and for summing such $I_{BLK}$ current with the output of said voltage to current converter during the blanking interval to provide a collector current $I_c$ during blanking for the first transistor; and
   c. a clamp feedback circuit producing the error signal and during the blanking interval being responsive to $V_{out}$ to adjust the error signal so that $I_c$ equals $I_{REF}$ thereby providing temperature compensated D.C. stabilization for $V_{out}$; and
   d. a 1/Vt amplifier responsive to $V_{out}$ for correcting the thermal voltage Vt to provide a compensated voltage $V_{out(comp)}$ during the picture interval.

* * * * *

UNITED STATES PATENT AND TRADEMARK OFFICE
CERTIFICATE OF CORRECTION

PATENT NO. : 4,786,970
DATED : November 22, 1988
INVENTOR(S) : Leslie G. Moore

It is certified that error appears in the above-identified patent and that said Letters Patent is hereby corrected as shown below:

Column 4, line 25, after "transistor" should read -- connected in series with the second transistor --.

Signed and Sealed this

Twenty-second Day of August, 1989

Attest:

DONALD J. QUIGG

Attesting Officer

Commissioner of Patents and Trademarks